US008891779B2

(12) United States Patent
Michaelis

(10) Patent No.: US 8,891,779 B2
(45) Date of Patent: Nov. 18, 2014

(54) IN-EAR EARPHONE

(75) Inventor: André Michaelis, Wedemark (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 400 days.

(21) Appl. No.: 13/186,988

(22) Filed: Jul. 20, 2011

(65) Prior Publication Data

US 2012/0020493 A1 Jan. 26, 2012

(30) Foreign Application Priority Data

Jul. 21, 2010 (DE) ........................ 10 2010 031 619

(51) Int. Cl.
*H04R 29/00* (2006.01)
*H04R 1/10* (2006.01)
*H04B 15/00* (2006.01)

(52) U.S. Cl.
CPC .................................... *H04R 1/1016* (2013.01)
USPC ................. 381/58; 381/59; 381/74; 381/94.1

(58) Field of Classification Search
CPC ........ H04R 5/003; H04R 1/1041; H04R 5/04; H04R 220/07; H04R 1/1016; H04R 1/1083; H04R 5/033; H04R 27/00; H04R 3/005; H04R 29/00; H04R 29/001; H04R 29/004; H04N 11/00; H04S 7/301; H04S 7/31; A61F 2011/145; G10K 11/1788; G10K 11/178; G10K 11/1786; G10K 2210/3217; G10K 11/1782; G10K 2210/1081
USPC .............. 381/74, 71.6, 23.1, 57, 56, 58, 71.1, 381/94.1
See application file for complete search history.

(56) References Cited

U.S. PATENT DOCUMENTS

| | | | | |
|---|---|---|---|---|
| 8,401,200 | B2 * | 3/2013 | Tiscareno et al. | 381/58 |
| 8,416,959 | B2 * | 4/2013 | Lott et al. | 381/71.6 |
| 2007/0019817 | A1 | 1/2007 | Siltmann | |
| 2007/0217642 | A1 | 9/2007 | Wickstorm et al. | |
| 2007/0297634 | A1 | 12/2007 | Hansson | |
| 2008/0137873 | A1 * | 6/2008 | Goldstein | 381/57 |

FOREIGN PATENT DOCUMENTS

| | | |
|---|---|---|
| DE | 10 2005 034 380 | 12/2006 |
| DE | 11 2006 003 784 | 4/2009 |
| EP | 1301060 | 4/2003 |
| WO | WO 2006/075275 | 7/2006 |

OTHER PUBLICATIONS

HeadRoom, "Home Audio Equipment Measurements", Oct. 2008.*

* cited by examiner

*Primary Examiner* — Vivian Chin
*Assistant Examiner* — David Ton
(74) *Attorney, Agent, or Firm* — Frommer Lawrence & Haug LLP

(57) ABSTRACT

There is provided an in-ear earphone comprising a housing having at least one electroacoustic transducer, a control unit which outputs a test signal to the electroacoustic reproduction transducer for reproduction, and a tightness measuring unit for measuring a parameter representative of the tightness of a fit of the earphone in an ear canal. The control unit is adapted to output a second audio signal as confirmation of a tight fit of the earphone to the electroacoustic reproduction transducer for reproduction.

4 Claims, 1 Drawing Sheet

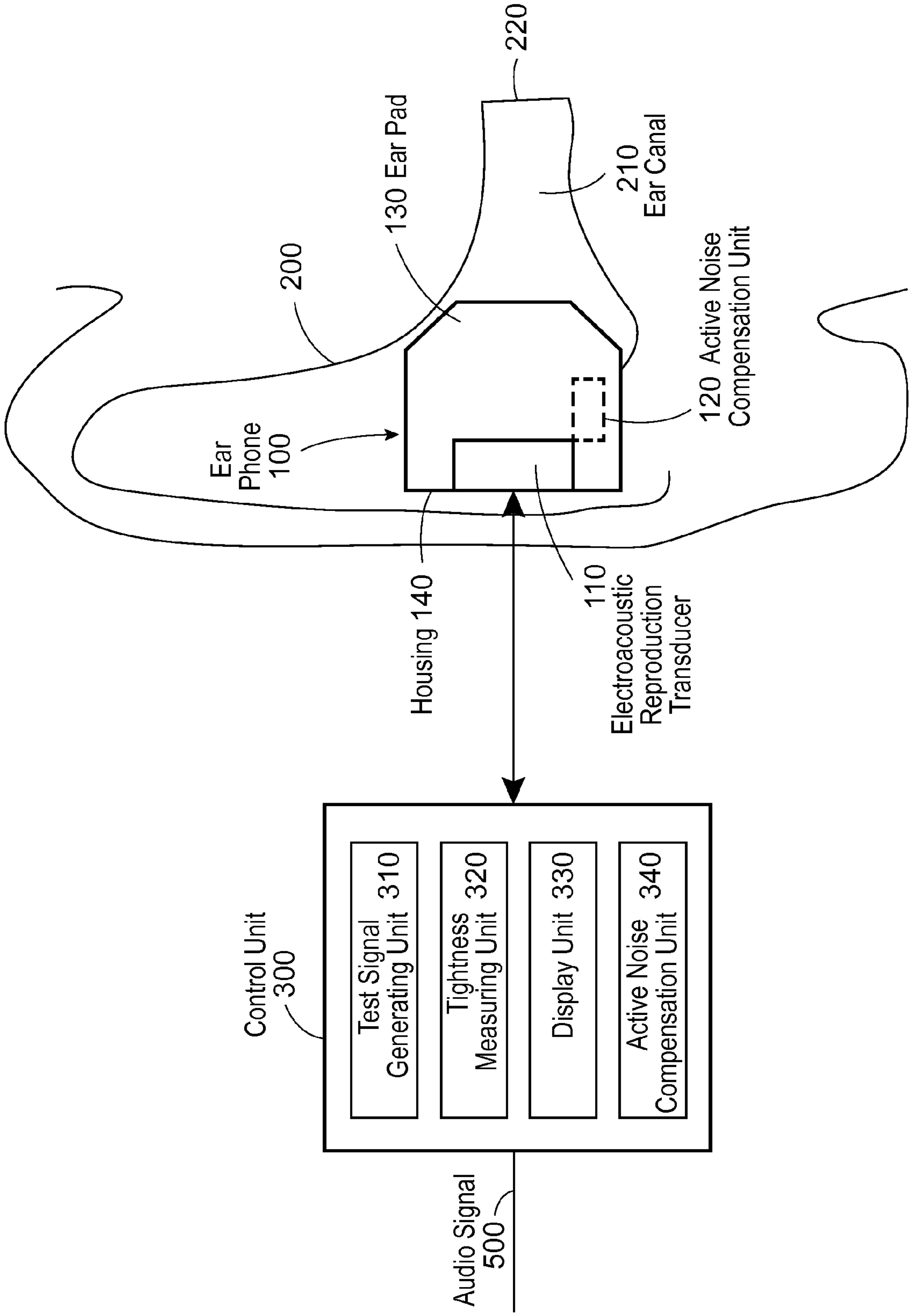
220
130 Ear Pad
210
Ear Canal
200
120 Active Noise
Compensation Unit
Ear
Phone
100
Housing 140
110
Electroacoustic
Reproduction
Transducer
Control Unit
300
Test Signal
Generating Unit 310
Tightness
Measuring Unit 320
Display Unit 330
Active Noise
Compensation Unit 340
Audio Signal
500

IN-EAR EARPHONE

The present application claims priority from German Patent Application Nos. DE 10 2010 0331 619.9 filed on Jul. 21, 2010, the disclosure of which is incorporated herein by reference in its entirety.

BACKGROUND OF THE INVENTION

1. Field of the Invention

The present invention concerns an in-ear earphone.

2. Description of Related Art

In-ear earphones or ear canal earphones require a tight fit in the ear or in the ear canal in order to be able to transmit low-pitch sounds to the eardrum of a user. The worst the fit, the correspondingly worse is the transmission of low-pitch sounds from the earphone to the eardrum.

As general state of the art attention is directed to DE 10 2005 034 380 B3, DE 11 2006 003 784 T5, EP 1 301 060 A1 and WO 2006/075275 A1.

SUMMARY OF THE INVENTION

An object of the present invention is to provide an in-ear earphone or an ear canal earphone which permits an improved fit of the in-ear earphone or ear canal earphone.

Thus there is provided an in-ear earphone having a housing having at least one electroacoustic reproduction transducer. The earphone further has a control unit adapted to output a first audio test signal to the electroacoustic reproduction transducer for reproduction. The earphone further has a tightness measuring unit for measuring a parameter representative of the tightness of a fit of an earphone. The control unit is adapted to output a second audio signal as confirmation of a tight fit of the earpiece to the electroacoustic reproduction transducer for reproduction.

The invention also concerns an in-ear earphone comprising a housing having at least one electroacoustic transducer, a control unit which outputs a test signal to the electroacoustic reproduction transducer for reproduction, and a tightness measuring unit for measuring a parameter representative of the tightness of a fit of an earphone. The earphone further has an active noise compensation unit for active noise compensation by means of audio signals detected by a microphone of ambient noises with a first and second operating mode. The control unit is adapted to activate the first operating mode when the tightness of the fit of the earphone has not yet been detected and to activate the second operating mode of the active noise compensation unit after the tightness measuring unit has detected the tightness of the fit of the earphone.

In an aspect of the invention the tightness measuring unit is adapted to perform an impedance measuring operation based on the test signal.

In a further aspect of the invention the earphone is in the form of an ear canal earphone.

The present invention concerns the notion of determining the tightness of the fit of an in-ear earphone or ear canal earphone in an ear or ear canal by means of a test signal. If the fit is not adequate an audio and/or visual warning or display can be outputted.

For example a pilot sound near the resonance frequency of approximately between 20 and 100 Hz can be used as the test signal, impedance measurement then being effected. If the fit is not sufficiently good a first audio signal (for example a hum) can be outputted and if the fit is adequate a second audio signal (for example a high sound or a rising sound) can be outputted in the in-ear earphone or ear canal earphone.

The first audio signal can be the test signal at the same time. From the fact that the first audio signal is outputted the user realises that he has not yet correctly inserted the earphone and the first audio signal causes him to correct the fit. The second audio signal serves as confirmation to the user that he has finally achieved a correct fit. The second audio signal is therefore preferably outputted only for a short period of time, for example less than 1.0 seconds.

To improve the fit of an in-ear earphone or ear canal earphone in an ear or ear canal, it is possible to provide various pads (different shape and size).

Further configurations of the invention are subject-matter of the appendant claims.

BRIEF DESCRIPTION OF THE DRAWINGS

FIG. 1 shows a diagrammatic view of an in-ear earphone or ear canal earphone according to a first embodiment.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However; because such elements are well known in the art, and because they do not facilitate a better understanding of the present invention, a discussion of such elements is not provided herein.

The present invention will now be described in detail on the basis of exemplary embodiments.

FIG. 1 shows a diagrammatic view of an in-ear earphone or ear canal earphone according to a first embodiment. The in-ear earphone of the first embodiment has a housing 140 having an electroacoustic reproduction transducer 110, optionally an active noise compensation unit 120 and a control unit 300. Optionally the control unit can be arranged in or outside the housing. An ear pad 130 can be provided at the ear end of the earphone 100. That ear pad 130 can project for example into the ear canal 210. The earphone can be in the form of an in-ear earphone or an ear canal earphone.

The control unit 300 has a test signal generating unit 310, a tightness measuring unit 320, optionally a display unit 330 and optionally an active noise compensation unit 340. The control unit 300 can optionally receive the audio signal 500 to be reproduced. As an alternative thereto the audio signal 500 to be reproduced can also be outputted directly to the earphone 100. The test signal generating unit 310 generates a test signal which is then transmitted to the electroacoustic reproduction transducer 110 for reproduction. In that case or subsequently the tightness measuring unit 320 can for example perform an impedance measuring operation. If the measured impedance is outside a permissible range then the display unit 330 can output an audio and/or visual display. The audio display can be effected for example in the form of first and second audio signals. The first audio signal can represent for example a hum and the second audio signal can represent a high or rising sound. The high or rising sound can then be reproduced by the electroacoustic reproduction transducer 110 so that the user realises when the measured tightness of the earphone (or the measured impedance) in the ear or ear canal reaches a desired value. Optionally an active noise compensation unit 120 can be provided in the earphone or in the control unit. When the active noise compensation unit is activated it is then possible by means of the control unit to also check whether the active noise compensation is operating sufficiently well.

Impedance measurement can be effected directly from the measurement of the current taken by the reproduction transducer 110 during the output of the test signal.

Checking the tightness for earphones with an active noise compensation unit 120 is of particular significance. Such a noise compensation unit can include a microphone for detecting the sound which is received at the noise compensation unit 120. The signal detected with that microphone is processed and a compensation signal for the reproduction transducer 110 is generated therefrom. Superimpositioning of the sound thereupon delivered by the reproduction transducer 110 with interference sound results in a reduction in the total sound which is received in the ear canal 210. In that case the sound delivered by the reproduction transducer 110 is also detected by the microphone. That therefore involves a closed feedback loop. Generation of the compensation signal is therefore to be such that the transmission characteristics from the reproduction transducer 110 to the microphone are taken into consideration. The more accurately those transmission characteristics are known, the correspondingly more effective can active noise compensation be implemented. The specified transmission characteristics greatly depend on whether the earphone is or is not tightly fitted in the ear. Therefore, for particularly effective noise compensation, there is the option of activating the noise compensation unit only when a tight fit has been established. Alternatively generation of the compensation signal can be effected in a first "safety mode" as long as tightness of the fit has not been checked and the arrangement can switch over into a second "effectiveness mode" as soon as fit tightness has been established.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. An in-ear earphone comprising:

a housing having at least one electroacoustic transducer;

a control unit which outputs a first audio test signal to the electroacoustic reproduction transducer for reproduction; and a tightness measuring unit for measuring a parameter representative of the tightness of a fit of the earphone in an ear canal;

wherein the control unit is adapted to output a second audio signal as confirmation of a tight fit of the earphone to the electroacoustic reproduction transducer for reproduction, wherein the tightness measuring unit is adapted to perform an impedance measuring operation based on a current taken by the electroacoustic reproduction transducer during the output of the test signal, and wherein the test signal has a resonance frequency between 20 and 100 Hz.

2. The in-ear earphone as set forth in claim 1;

wherein the earphone is in the form of an ear canal earphone.

3. An in-ear earphone comprising:

a housing having at least one electroacoustic transducer a control unit which outputs a first audio test signal to the electroacoustic reproduction transducer for reproduction;

a tightness measuring unit for measuring a parameter representative of the tightness of a fit of the earphone in an ear canal; and an active noise compensation unit for active noise compensation by using audio signals detected by a microphone of ambient noises with a first and second operating mode;

wherein the control unit is adapted to activate the first operating mode when the tightness of the fit of the earphone has not yet been detected and to activate the second operating mode of the active noise compensation unit after the tightness measuring unit has detected the tightness of the fit of the earphone, wherein the tightness measuring unit is adapted to perform an impedance measuring operation based on a current taken by the electroacoustic reproduction transducer during the output of the test signal, and wherein the test signal has a resonance frequency between 20 and 100 Hz.

4. The in-ear earphone as set forth in claim 3;

wherein the earphone is in the form of an ear canal earphone.

* * * * *